June 3, 1958 F. W. YOUNG 2,837,345
FOLDING SEATS FOR TELESCOPING CARTS
Filed Nov. 9, 1956 4 Sheets-Sheet 1
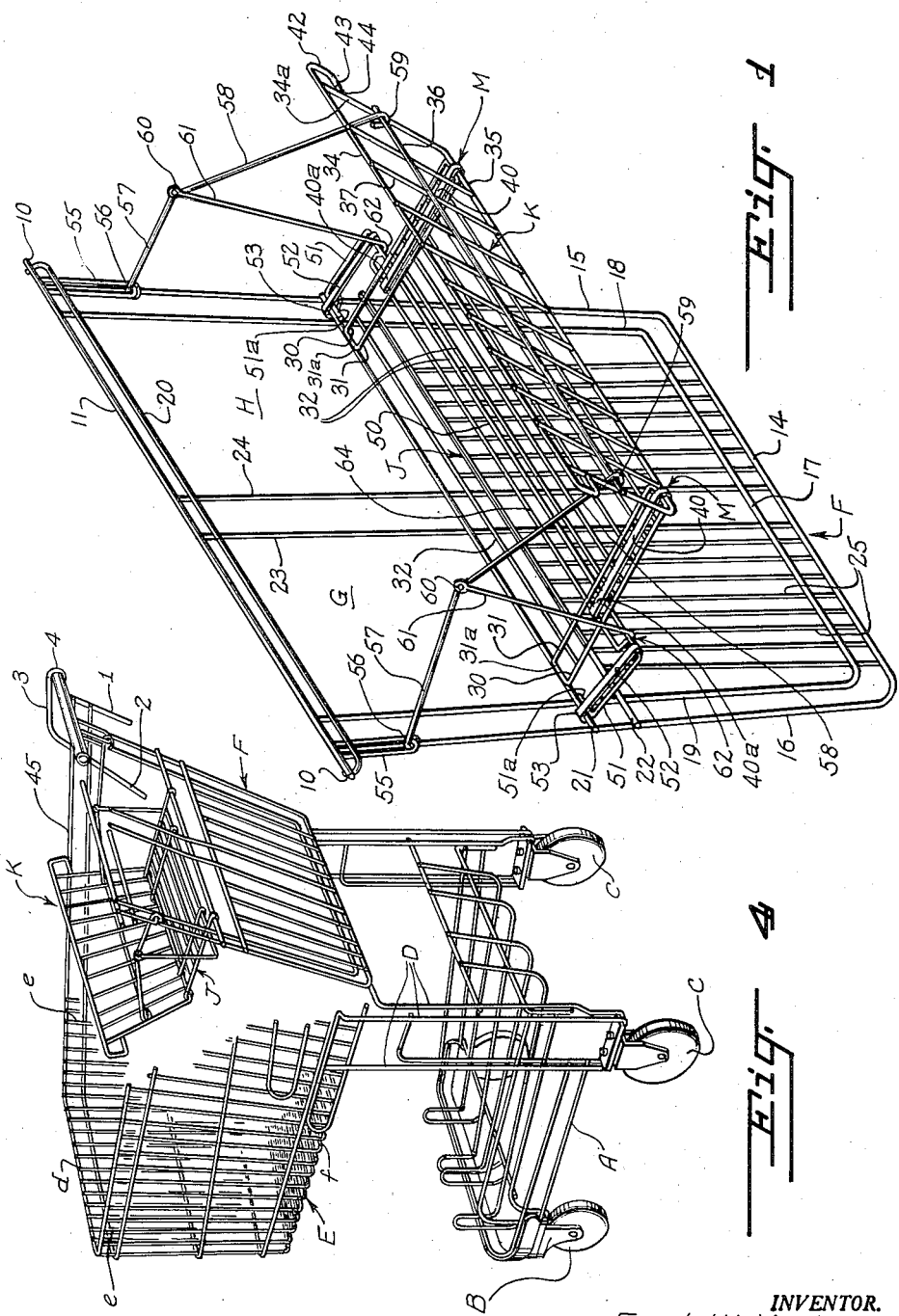
INVENTOR.
Fred W. Young
BY Ralph T. Bassett
Attorney June 3, 1958        F. W. YOUNG        2,837,345
FOLDING SEATS FOR TELESCOPING CARTS
Filed Nov. 9, 1956        4 Sheets-Sheet 2
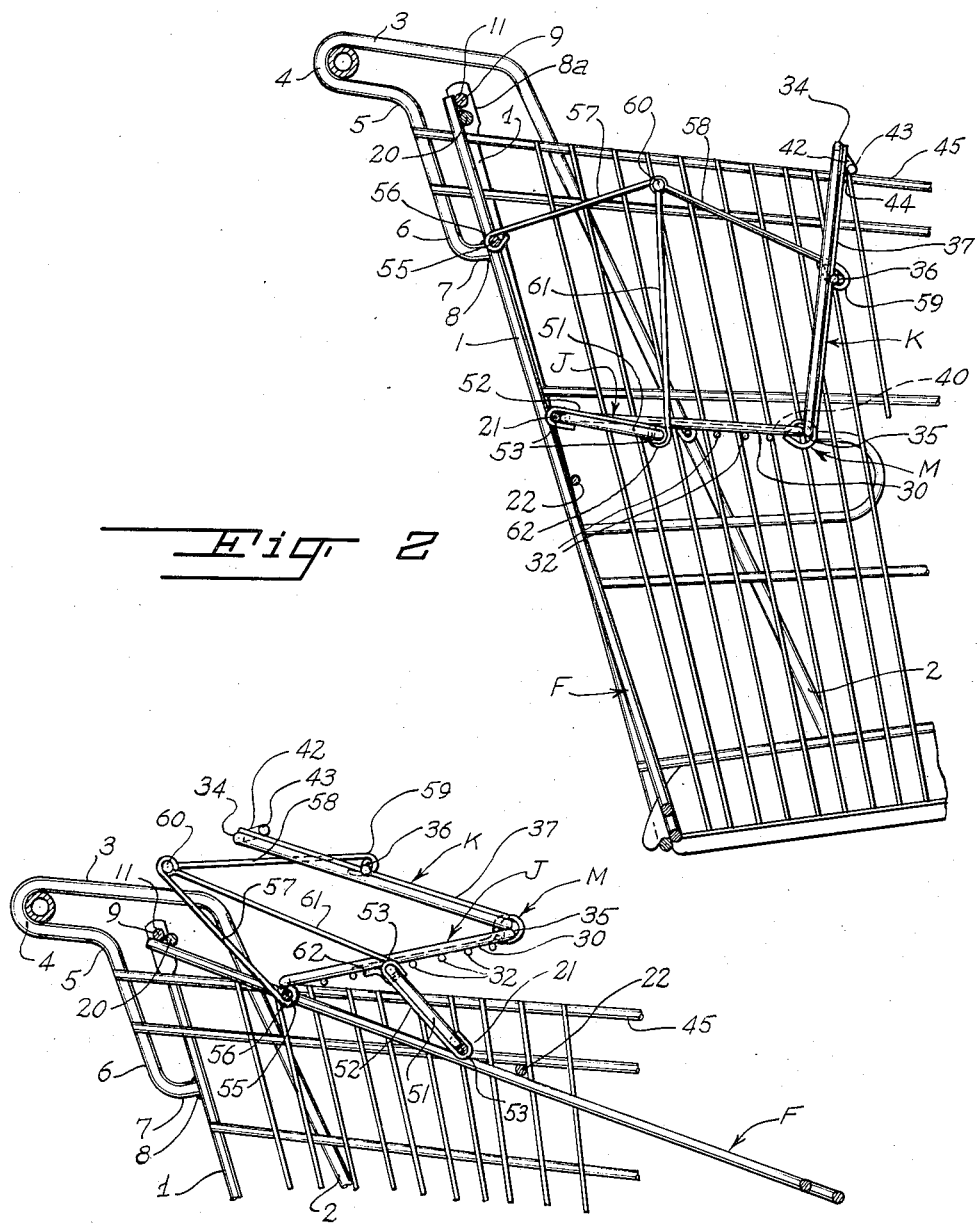
INVENTOR.
Fred W. Young
BY Ralph L. Bassett
Attorney June 3, 1958 F. W. YOUNG 2,837,345
FOLDING SEATS FOR TELESCOPING CARTS
Filed Nov. 9, 1956 4 Sheets-Sheet 3
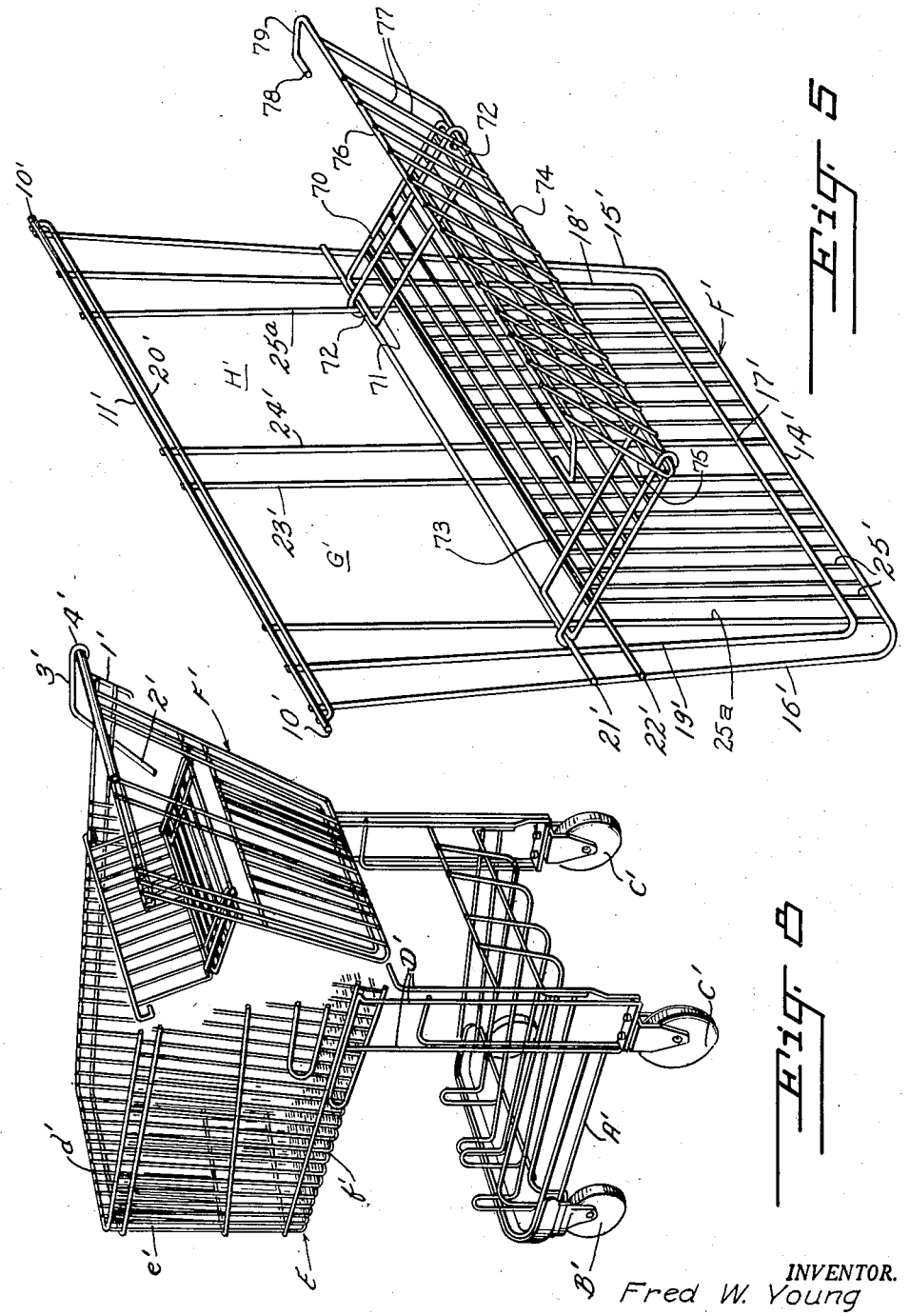
INVENTOR.
Fred W. Young
BY Ralph L. Bassett
Attorney June 3, 1958 F. W. YOUNG 2,837,345
FOLDING SEATS FOR TELESCOPING CARTS
Filed Nov. 9, 1956 4 Sheets-Sheet 4

INVENTOR.
Fred W. Young
BY *Ralph T. Bassett*
Attorney

United States Patent Office 2,837,345
Patented June 3, 1958

2,837,345

FOLDING SEATS FOR TELESCOPING CARTS

Fred W. Young, Oklahoma City, Okla., assignor to Sylvan N. Goldman, Oklahoma City, Okla.

Application November 9, 1956, Serial No. 621,242

12 Claims. (Cl. 280—33.99)

This invention relates to improvements in folding seats for telescoping carts of the general type shown in Goldman Patent No. 2,689,133.

The main object of the present invention is to provide a folding baby seat which is mounted upon the swinging tail gate of a telescoping cart and is so constructed and arranged as to occupy a minimum amount of space in the cart, thus permitting the cart to accommodate a maximum quantity of products.

Another object of the invention is to provide a structure which will insure positive collapsing or folding of the seat upon operation of the swinging gate during telescoping of a pair of associated carts.

Further objects of the invention reside in the provision of a simple and inexpensive mounting structure for the seat, as well as a novel form of seat structure which is associated with the mounting to insure quicker and positive folding during the operation.

Further objects of the invention will more clearly hereinafter appear by reference to the accompanying drawings forming a part of the instant application, and wherein like characters of reference designate corresponding parts throughout the several views, in which:

Fig. 1 is a perspective view of a seat assembly mounted on a hinge gate;

Fig. 2 is a fragmentary transverse sectional view through a seat structure showing the gate in supporting position;

Fig. 3 is a fragmentary sectional view showing the seat partially collapsed with the hinged gate in elevated position;

Fig. 4 is a perspective view of a telescoping cart with the present invention associated therewith;

Fig. 5 is a perspective view of a modified form of seat for a hinged gate;

Fig. 8 is a perspective view of a telescoping cart with the invention of Fig. 5 mounted therein.

Figure 6:
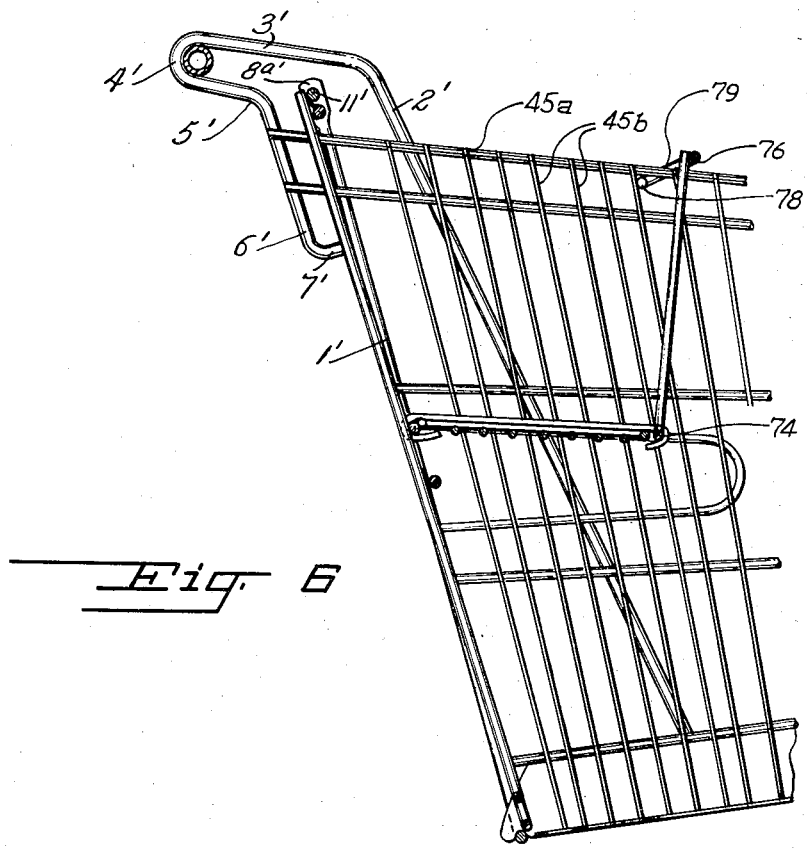
Fig. 6 is a transverse section through the gate, showing the seat in open position.

In Fig. 4 a conventional telescoping cart such as used in grocery stores and the like is illustrated, this cart embodying a base structure A with front and rear supporting wheels B and C, respectively. Extending from the rear wheels and above the base are the vertical supports D, these supports mounting a forwardly tapered basket generally indicated at E. The basket E is formed to include side walls e, end wall d and bottom f, the latter being inclined from the horizontal to facilitate the telescopic association of a pair of carts. The rear portion of each of the side walls e of the basket structure is supported and braced by converging rearwardly inclined uprights 1 and 2, the latter upright 2 having its upper terminal 3 extending rearward in a generally horizontal plane and looped at 4 to provide the return bend 5, the latter terminating in downward extending extension 6 which projects forward at 7 for connection at 8 to the upright 1. The uprights 1 at each side of the basket have their upper extremities 8ª flattened and provided with openings 9 for receiving the ends 10 of the transverse rod 11 of the hinged gate generally indicated at F. The hinged gate F may be fabricated in various ways, however, in the present disclosure the rear gate is shown as formed of a pair of wickets, the outer wicket having a base 14 and side arms 15 and 16, while the inner wicket has a base 17 and side arms 18 and 19. The upper extremities of the arms 15—18 and 16—19 are connected to the hinge rod 11 and to associated brace rod 20 which is spaced from the hinge rod 11 and extends generally parallel thereto. Medially of the wickets are transverse brace rods 21 and 22 which extend across the arms of the two wickets and are welded at points of intersection. A pair of vertical stays 23 and 24 are positioned medially of the gate structure and connect the hinge rod 11 and the brace rod 20 with the bases 14 and 17 of the wickets, these parts being welded at their points of intersection. A plurality of vertical rods or wires 25 which are shown as generally equally spaced and illustrated as projecting vertically between the medial transverse rods 22 and the base 14 of the outer wicket provide a closure for the bottom portion of the hinge gate panel. The upper portion of the panel as shown in Fig. 1 provides a pair of spaced leg openings G and H for the passage of the legs of an infant occupying the instant invention, as will be more clearly hereinafter described.

The seat includes a bottom J and a back K, these two parts being hinged together for folding movement. The bottom J is in the form of a fabricated panel made of spaced end wires 30 and 31 connected together at their extremities 31ª to form rectangular frame members. These rectangular frame members overlie the spaced parallel intersecting wires 32 and are connected thereto at points of intersection by welding. The seat back K is generally similarly constructed including top horizontal rod 34, bottom parallel horizontal rod 35 and a medial parallel rod 36, these three rods being connected at points of intersection by vertical spaced wires 37. The seat bottom J and the seat back K are hinged together at spaced points M by any suitable form of hinge structure. In the present disclosure the straps 40 which are welded to the wires 32 terminate in loops which wrap about the bottom horizontal rod 35 of the back. Any number of suitable hinge points may be provided to secure uniform folding of the seat back K rearwardly and downwardly upon the top of the bottom J of the seat. The inner ends of the straps 40 form a clasp or lock for securing an operating linkage to the bottom K to facilitate movement of the parts as more fully hereinafter described. The upper horizontal rod 34 projects outwardly from the ends of the seat back K and its ends are bent downwardly at 42 and inwardly at 43 where they are welded at 44 to the end frame members 34ª of the seat back. The end frame members 34ª are formed integral with the bottom horizontal rod 35, as best shown in Fig. 1. The extremities of the upper horizontal rod 34 defined by the bent terminal portions 42—43 form supports for the seat back and normally rest upon and travel along or rock upon the upper face of the top of the frame 45 of the side walls e of the basket structure. The top frame member of the side walls e is generally in the form of a rod or bar and presents a smooth surface over which the supporting loops 42—43 are free to pivot or travel as the seat moves to folded position when the gate is swung on its pivots 10. Hinged to the upper transverse brace rod 21 of the swinging gate is a rectangular frame formed of a U-shaped member having a base portion 50 and arms 51 with inturned extremities 51ª. This frame is provided with straps 52 which are wrapped at their extremities 53 about the brace rod 21 and frame member 50 to permit this frame structure to swing freely at these pivotal points. This frame structure 50—51 is normally positioned below the seat bottom J and forms a support for the free edge of the latter, both during seating and folding operation. In addition, the swinging movement of the frame structure 50—51 will carry with it the seat bottom J, as shown in Fig. 3.

A pair of depending supporting loops 55 of wire or other suitable material are arranged at the ends of hinge bar 11 at the upper portion of the swinging gate and the bases of these depending loops form supports for the hooked terminals 56 of the links 57. The links 57 are pivotally connected at their opposite end portions 60 to the links 58 providing a toggle structure. The links 58 terminate in hooks 59 which are freely wrapped about the medial parallel rod 36 of the seat back to permit swinging movement of these parts. The pivotal connections 60 between the pairs of links 57 and 58 are also pivotally connected to a pair of depending links 61 which have their lower extremities bent outwardly and upwardly to form cradles 62 which support the base 50 of the hinge frame 50—51. The cradles or upwardly facing loops 62 are of such size and shape as to freely support the frame base 50 to permit relative movement between these parts during folding movement of the linkage. The ends of the depending links 61 after the formation of the cradles or upwardly facing loops 62 are connected together as at 64 to insure simultaneous movement of the parts and to brace the structure. As shown in Fig. 2 the links 57 and 58 have their pivotal connections positioned above the horizontal dead center of the toggle so that they will always be free to move upwardly during a collapsing operation of the seat structure, this upward movement carrying the cradles 62, the supporting frame 50—51 mounted on the cradles, and the seat J mounted on the supporting frame. By this means when the hinged gate F is swung as shown in Fig. 3 on its pivot 10 during telescoping of two associated carts, this swinging movement will carry with it the child's seat structure and the linkage heretofore described. As the gate is elevated the back K will tend to fold upon the seat J due to the weight of the parts and folding of the toggle links 57—58 and the supporting frame 50—51 will swing upwardly with its pivotal connection on the cross brace 32 and carry with it the seat J. This movement of the parts will continue until the seat back K rests against the seat J, and the latter abuts the supporting frame 50—51 and the gate F. Fig. 3 illustrates these parts during folding movement. As previously stated the free ends 40ᵃ of the straps 40 overlie the connection 64 between the ends of the cradles 62 to prevent displacement of the base member 50 of the frame from the cradles 62. These free ends 40ᵃ of the straps 40 do not necessarily have to be welded to the connection 64 but will function to hold the base 50 in the loops by virtue of the resiliency of the metal straps. In this way the assembly of the parts may be facilitated.

In the modified form of the invention shown in Figs. 5–8, inclusive, the same type of seat is shown mounted on the same type of cart, the differences residing primarily in the elimination of the positive actuating mechanism in the form of linkage heretofore described and by means of which positive folding action is obtained in the disclosure of Figs. 1–4. In this modified disclosure the same type of cart is shown and includes a base structure A' with front and rear supporting wheels B' and C', respectively. Extending from the rear wheels and above the base structure A' are the vertical supports D', these supports mounting a forwardly tapered basket indicated at E'. The basket is formed to include side walls e', end wall d', and bottom f', the latter being inclined from the horizontal to facilitate the telescopic association of a pair of carts. The rear portion of each of the side walls e' of the basket is supported and braced by converging rearwardly inclined uprights 1' and 2', the upright 2' having its upper terminal 3' extending rearward in a generally horizontal plane and looped at 4' to provide the return bend 5', the latter terminating in downward extending extension 6' which projects forward at 7' for connection at 8' to the upright 1'. The uprights 1' at each side of the basket have their upper extremities 8ᵃ' flattened and provided with openings 9' for receiving the ends 10' of the transverse rods 11' of the hinge gate generally indicated at F'.

In the modification of Figs. 5 through 8, the same type of gate is illustrated as shown in the preferred form of the invention, the parts being fabricated to include a pair of wickets, the outer wicket having a base 14' and side arms 15' and 16', while the inner wicket has a base 17' and side arms 18' and 19'. The upper extremities of the arms 15'—18' and 16'—19' are connected to the hinge rod 11' and to associated brace rod 20' which is spaced from the hinge rod 11' and extends generally parallel thereto. Medially of the wickets are transverse brace rods 21' and 22' which extend across the arms of the two wickets and are welded at points of intersection. A pair of vertical stays 23' and 24' are positioned medially of the gate structure and connect the hinge rod 11 and the brace rod 20 with the bases 14' and 17' of the wickets, these parts being welded at their points of intersection. A plurality of vertical rods or wires 25' which are shown as generally equally spaced and illustrated as projecting vertically between the medial transverse rods 22' and the base 14' of the outer wicket provide a closure for the bottom portion of the hinge gate panel. The upper portion of the panel as shown in Fig. 1 provides a pair of spaced leg openings G' and H' for the passage of the legs of an infant seated in the instant invention. In addition the end vertical stays 25ᵃ extend the full length of the gate to increase the strength of the structure at a point at which the seat is to be mounted and as will be more fully hereinafter described.

Figure 7:
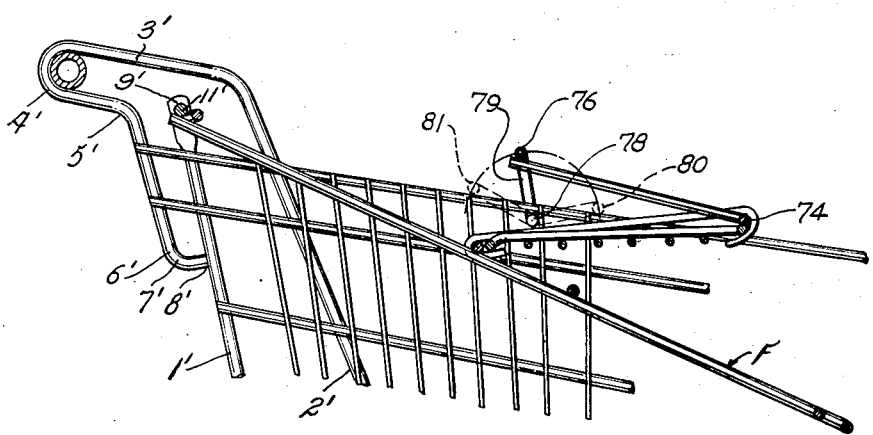
Fig. 7 is a fragmentary sectional view showing the seat partially collapsed with the hinged gate elevated.

In the disclosure of Figs. 5–8, inclusive, the seat bottom is formed as a fabricated panel to include transversely extending end frames of horizontal structure, each of which includes side members 70 and 71 and connecting end members 72. A plurality of longitudinally extending spaced cross rods or wires of suitable gauge and indicated at 73 extend across the end frames and are welded to the latter at points of intersection. To the seat bottom is hinged a seat back formed of an outer U-shaped frame including a base 74 and arms 75, the ends of which are welded to the upper cross brace 76. A plurality of vertically extending spaced rods 77 connect and are welded at points of intersection with the base member 74 and the upper cross member 76. The upper cross brace 76 has its extremities extending beyond the seat back proper and these extremities are bent downwardly as at 79 and inwardly as at 78, the projections being of sufficient dimension to permit these portions to extend beyond the side walls e' of the basket structure. The inwardly projecting ends 78 of the hooks at the ends of the cross brace 76 will extend inwardly below the top braces 45ᵃ of the side walls e' of the basket structure and will be limited in their movement to a space determined by the spaced wires 45ᵇ of which the side walls are fabricated. The sliding and swinging of the hooks 78—79 during folding of the gate is best shown in Fig. 7 in which figure the hook is in its medial position during transition of the seat to collapsed position but the extreme movements of the hooks from seat open to seat collapsed position are illustrated in dotted lines by reference characters 80 and 81, respectively.

The present development is extremely cheap and simple and having all movable parts hinged for free movement, such parts readily collapse when the hinge gate swings during telescoping movement of an associated cart. The weight of the child is entirely supported on the hooks 78 and 79 which engage in the side frames of the basket and are locked into position so that they cannot be disengaged either in their seat supporting position or during folding, as heretofore described. As the swinging gate moves upwardly the inner portion of the seat bottom projects forwardly causing a parallel rotary movement of the hooks 78 and 79, as shown in Fig. 7, and a general movement of the seat back forwardly. Thus the seat back moves rearwardly while the seat bottom moves forwardly and the two parts come together as the gate upon which the seat bottom is supported moves upwardly, thus completing the seat folding operation. As the swinging gate is lowered, the seat opens and will remain open at all times except when the rear gate is elevated during nesting with an associated assembly.

What I claim is:

1. In a folding seat for a telescoping cart, said cart including a receptacle having side walls, a bottom and a hinged gate at one end, said gate being formed at its upper portion with leg openings, a collapsible seat structure including a seat bottom and a seat back hinged together, means projecting from the seat back and overlying and swingably supported upon the upper face of the side walls of the receptacle for supporting the seat back, and means for hingedly supporting the outer marginal edge portion of the seat bottom from the swinging gate immediately adjacent and below the leg openings.

2. In a folding seat for a telescoping cart, said cart including a receptacle having side walls, a bottom and a hinged gate at one end, said gate being formed at its upper portion with leg openings, a collapsible seat structure including a seat bottom and a seat back hinged together, means projecting laterally from the top portion of each side of the seat back and pivotally supported upon the side walls of the receptacle for supporting the seat back, and means for pivotally supporting the outer marginal edge portion of the seat bottom from the swinging gate immediately adjacent and below the leg openings.

3. In a folding seat for a telescoping cart, said cart including a receptacle having side walls, a bottom and a hinged gate at one end, said gate being formed at its upper portion with leg openings, a collapsible seat structure including a seat bottom and a seat back hinged together, means projecting laterally from the upper end portions of each end of the seat back and slidably and hingedly mounted upon the side walls of the receptacle for supporting the seat back, and means hingedly supporting the outer marginal edge portion of the seat bottom from the swinging gate immediately adjacent and below the leg openings.

4. In a folding seat for a telescoping cart, said cart including a receptacle having side walls, a bottom and a hinged gate at one end, said gate being formed at its upper portion with leg openings, a collapsible seat structure including a seat bottom and a seat back hinged together, means projecting from the seat back and engaging the side walls for pivotally supporting the same thereon, means pivoted to the hinged gate immediately adjacent and below the leg openings and projecting beneath the seat bottom for supporting the latter, hinged links connecting each end portion of the seat back and the upper portion of the swinging gate, and a link interposed between and connecting the link hinge and the projecting seat support.

5. The structure of claim 4 characterized in that the means pivoted to the hinged gate for supporting the seat bottom consists of an elongated fabricated panel which is hingedly connected along one side of the gate structure.

6. The structure of claim 4 characterized in that the hinged links connecting the end portion of the seat back and the upper portion of the swinging gate are positioned at their joint off-center to facilitate link movement during collapsing of the seat structure.

7. In a folding seat for a telescoping cart, said cart including a receptacle having side walls, a bottom and a hinged gate at one end, said gate being formed at its upper portion with leg openings, a collapsible seat structure including a seat bottom and a seat back hinged together, means projecting from the seat back and engaging the side walls for pivotally supporting the same thereon, means pivoted to the hinged gate immediately adjacent and below the leg openings and projecting beneath the seat bottom for supporting the latter, means connecting an end portion of the seat back and the upper portion of the gate, and a second connection between the medial portion of the first connection and the projecting seat support for supporting the latter and coordinating the movement of the associated parts during swinging movement of the hinged gate.

8. The structure of claim 7 characterized in that the connections are duplicated at each end of the seat structure.

9. In a folding seat for a telescoping cart, said cart including a receptacle having side walls, a bottom and a hinged gate at one end, said gate being formed at its upper portion with leg openings, a collapsible seat structure including a seat bottom and a seat back hinged together, means projecting from the seat back and engaging the side walls for pivotally supporting the same thereon, and means pivoted to the hinged gate immediately adjacent and below the leg openings and projecting beneath the seat bottom for supporting the latter.

10. In a folding seat for a telescoping cart, said cart including a receptacle having side walls, a bottom and a hinged gate at one end, said gate being formed at its upper portion with leg openings, a collapsible seat structure including a seat bottom and a seat back hinged together, said seat bottom having one marginal edge pivotally connected to the gate adjacent the bottom edges of said leg openings, and projections extending from the opposite upper portions of the seat back and supported by the top portion of the side walls of the receptacle for supporting the seat structure.

11. The structure of claim 10 characterized in that the means projecting from the top ends of the seat back are swingably mounted upon the side walls of the receptacle.

12. The structure of claim 10 characterized in that the means projecting from the top ends of the seat back are slidably and swingably mounted upon the side walls of the receptacle.

References Cited in the file of this patent

UNITED STATES PATENTS

| | | |
|---|---|---|
| 1,562,089 | Holley | Nov. 17, 1925 |
| 2,662,775 | Goldman | Dec. 15, 1953 |
| 2,689,133 | Goldman | Sept. 14, 1954 |
| 2,769,645 | Young | Nov. 6, 1956 |